(12) United States Patent
Tsuchiya (10) Patent No.: US 12,356,299 B2
(45) Date of Patent: Jul. 8, 2025

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Takaki Tsuchiya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 516 days.

(21) Appl. No.: 17/700,501

(22) Filed: Mar. 22, 2022

(65) Prior Publication Data

US 2023/0100369 A1 Mar. 30, 2023

(30) Foreign Application Priority Data

Sep. 24, 2021 (JP) .................................. 2021-156031

(51) Int. Cl.
*H04W 4/80* (2018.01)
(52) U.S. Cl.
CPC ..................................... *H04W 4/80* (2018.02)
(58) Field of Classification Search
CPC ....................................................... H04W 4/80
USPC ......................................................... 455/42.1
See application file for complete search history.

(56) References Cited

U.S. PATENT DOCUMENTS

| | | | | |
|---|---|---|---|---|
| 9,648,581 | B1 * | 5/2017 | Vaynblat | H04L 67/535 |
| 9,672,538 | B1 * | 6/2017 | Vaynblat | G06Q 30/0255 |
| 9,674,660 | B1 * | 6/2017 | Vaynblat | G06F 16/9537 |
| 9,852,443 | B1 * | 12/2017 | Vaynblat | H04W 4/21 |
| 9,860,699 | B1 * | 1/2018 | Vaynblat | H04L 51/08 |
| 9,898,763 | B1 * | 2/2018 | Vaynblat | G06F 16/9535 |
| 2014/0089243 | A1 * | 3/2014 | Oppenheimer | H04L 67/12 706/46 |
| 2016/0085999 | A1 * | 3/2016 | Oppenheimer | G06F 11/3419 726/35 |
| 2016/0110975 | A1 * | 4/2016 | Oppenheimer | G06N 3/08 340/572.1 |
| 2017/0024771 | A1 * | 1/2017 | Flitsch | A61B 3/113 |

(Continued)

FOREIGN PATENT DOCUMENTS

| | | |
|---|---|---|
| JP | 2014115842 | 6/2014 |
| JP | 6639225 | 2/2020 |

(Continued)

OTHER PUBLICATIONS

"Notice of Reasons for Refusal of Japan Counterpart Application", issued on Feb. 18, 2025, with English translation thereof, p. 1-p. 8.

*Primary Examiner* — April G Gonzales
(74) *Attorney, Agent, or Firm* — JCIPRNET (57) ABSTRACT

An information processing apparatus includes a processor configured to: identify a target user and a companion accompanying the target user, in accordance with communication log information and a user identifier of the target user, the communication log information indicating a log of short-range wireless communication of a target mobile terminal used by the target user and including a user identifier of a nearby user using a nearby mobile terminal having performed short-range wireless communication with the target mobile terminal; and provide, to the target user and/or the companion, provision information that is selected in accordance with the target user and the companion.

9 Claims, 8 Drawing Sheets

(56) References Cited

U.S. PATENT DOCUMENTS

| | | | | |
|---|---|---|---|---|
| 2017/0186080 A1* | 6/2017 | Furuya | ............... | G06Q 30/0643 |
| 2019/0035245 A1* | 1/2019 | Oppenheimer | ....... | H04W 4/021 |
| 2019/0349728 A1* | 11/2019 | Oppenheimer | ......... | H04W 4/33 |
| 2019/0362610 A1* | 11/2019 | Oppenheimer | ...... | G06K 19/041 |
| 2020/0283029 A1* | 9/2020 | Mimura | .......... | B60W 60/00253 |
| 2021/0256825 A1* | 8/2021 | Oppenheimer | ......... | G06F 21/50 |
| 2021/0295837 A1* | 9/2021 | Toda | ....................... | G06F 13/00 |

FOREIGN PATENT DOCUMENTS

| | | |
|---|---|---|
| JP | 6762060 | 9/2020 |
| KR | 1020170043913 | 4/2017 |

* cited by examiner

| RECEPTION TIME | USER ID OF NEARBY USER USING NEARBY MOBILE TERMINAL |
|---|---|
| 02/15/2021 09:30 | NONE |
| 02/15/2021 09:31 | U0001 |
| ... | ... |
| 02/15/2021 09:53 | U0001, U0002 |
| 02/15/2021 09:54 | U0001, U0002 |
| 02/15/2021 09:55 | U0001, U0002 |
| 02/15/2021 09:56 | U0001, U0002 |
| 02/15/2021 09:57 | U0001, U0002 |
| 02/15/2021 09:58 | U0001, U0002 |
| 02/15/2021 09:59 | U0001, U0002 |
| 02/15/2021 10:00 | U0001, U0002, U1234 |

| USER ID | NAME | ADDRESS | AGE | SEX | RELATED USERS | LIKING | | ... |
|---------|------|---------|-----|-----|---------------|--------|--|-----|
| | | | | | | PRODUCTS, SERVICES | FOOD | |
| U0000 | TARO FUJI | YOKOHAMA CITY, KANAGAWA PREFECTURE, JAPAN | 25 | MALE | U0001 (SPOUSE) U0002 (PARENT) | CAMPING, FISHING | JAPANESE FOOD, WESTERN FOOD, CHINESE FOOD | ... |
| U0001 | HANAKO FUJI | YOKOHAMA CITY, KANAGAWA PREFECTURE, JAPAN | 25 | FEMALE | U000 (SPOUSE) U0002(PARENT-IN-LAW) | FLOWERS, AROMA, CHILDREN'S GOODS, | JAPANESE FOOD, WESTERN FOOD | ... |
| U0002 | YUKO FUJI | FUJISAWA CITY, KANAGAWA PREFECTURE, JAPAN | 50 | FEMALE | U0001 (CHILD) U0002 (CHILD-IN-LAW) | JAPANESE SWEETS, COFFEE | JAPANESE FOOD, CHINESE FOOD | ... |
| ... | ... | ... | ... | ... | ... | ... | ... | ... |

FIG. 6

| ADVERTISEMENT ID | ADVERTISEMENT NAME | ADVERTISING STORE | LIKING OF ADVERTISEMENT TARGET | CONDITION FOR NUMBER OF COMPANIONS | GIFT | ... |
|---|---|---|---|---|---|---|
| A0000 | CAMPING EQUIPMENT | CAMPING EQUIPMENT STORE A | CAMPING, OUTDOORS | - | YES | ... |
| A0001 | FISHING GEAR | FISHING GEAR SPECIALTY STORE B | FISHING, OUTDOORS | - | YES | ... |
| A0002 | JAPANESE SWEETS | JAPANESE SWEET STORE C | JAPANESE SWEETS | - | YES | ... |
| A0003 | CHILDREN'S CLOTHING | CHILDREN'S GOODS STORE D | CHILDREN'S GOODS | - | YES | ... |
| A0004 | DOMESTIC TRAVEL PLAN | TRAVEL AGENCY E | - | | NO | ... |
| A0005 | ALL-YOU-CAN-EAT COURSE FOR CHINESE FOOD | CHINESE RESTAURANT F | CHINESE FOOD | TWO OR MORE | NO | ... |
| A0006 | JAPANESE SET MEAL | RESTAURANT G | JAPANESE FOOD | TWO OR MORE | NO | ... |
| ... | ... | ... | ... | ... | ... | ... |

| USER ID OF TARGET USER | USER ID'S OF COMPANIONS | NUMBER OF TIMES OF ACCOMPANYING |
|---|---|---|
| U0000 | U0001 | 18 |
| | U0002 | 5 |
| | U9999 | 1 |
| | ... | ... |
| U0001 | U0000 | 18 |
| | U0002 | 7 |
| | U8787 | 1 |
| | ... | ... |
| U0002 | U0000 | 5 |
| | U0002 | 7 |
| ... | ... | ... |

| RECEPTION TIME | USER ID OF NEARBY USER USING NEARBY MOBILE TERMINAL |
|---|---|
| . . . | . . . |
| 02/15/2021 13:00 | U0001, U0002 |
| 02/15/2021 13:01 | U0001 |
| 02/15/2021 13:02 | U0001 |
| 02/15/2021 13:03 | U0001 |
| 02/15/2021 13:04 | U0001 |
| 02/15/2021 13:05 | U0001 |

FIG. 9

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2021-156031 filed Sep. 24, 2021

BACKGROUND

(i) Technical Field

The present disclosure relates to an information processing apparatus, non-transitory computer readable medium, and information processing method.

(ii) Related Art

Systems providing information on products or services supporting users are disclosed.

Japanese Patent No. 6639225 discloses a shopping support system that identifies a specific product that fully or partially matches a keyword beforehand registered by a user and displays the specific product on a floor map of a store. Japanese Patent No. 6762060 discloses a technique of making a recommendation to a guest or his or her companion in accordance with information on guests beforehand registered in a management system of a hotel, called property management system (PMS). For example, the technique is used to recommend, to a family as guests of the hotel including an infant, a restaurant that accepts the family in accordance with the quest information on, for example, an address, names, nationality, payment method, companion name, accommodation history, etc.

Some sort of provision information on a user and his or her companion may be provided to the user and/or the companion. In this case, it is contemplated that information indicating the user and companion is beforehand entered to an information processing apparatus and that the information processing apparatus selects the provision information for the user and companion in accordance with that information.

In the method described above, however, the information indicating the user and companion is to be beforehand entered to the information processing apparatus and an input operation may be time-consuming. Depending on an environment where the provision information is provided, it may be possibly difficult to enter beforehand the information indicating the companion.

SUMMARY

Aspects of non-limiting embodiments of the present disclosure relate to providing provision information on a user and companion without entering beforehand information on the companion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: identify a target user and a companion accompanying the target user, in accordance with communication log information and a user identifier of the target user, the communication log information indicating a log of short-range wireless communication of a target mobile terminal used by the target user and including a user identifier of a nearby user using a nearby mobile terminal having performed short-range wireless communication with the target mobile terminal; and provide, to the target user and/or the companion, provision information that is selected in accordance with the target user and the companion.

BRIEF DESCRIPTION OF THE DRAWINGS

Exemplary embodiment of the present disclosure will be described in detail based on the following figures, wherein.

DETAILED DESCRIPTION

Figure 1:
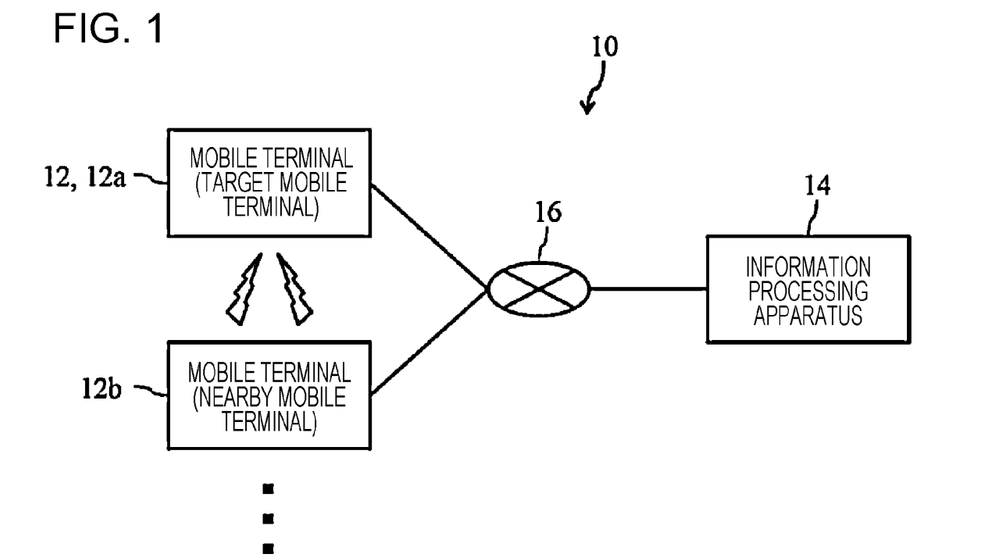
FIG. 1 illustrates a configuration of an information processing system of an exemplary embodiment.

FIG. 1 illustrates a configuration of an information processing system 10 of an exemplary embodiment. The information processing system 10 includes multiple mobile terminals 12 used by multiple users and information processing apparatus 14. Each mobile terminal 12 and information processing apparatus 14 are connected to each other via a communication network 16, such as a local-area network (LAN) and/or the Internet.

As described in greater detail below, the information processing system 10 provides provision information to users. In particular, the information processing system 10 identifies a companion who accompanies a user and provides the provision information responsive to the user and companion. According to the exemplary embodiment, the information processing system 10 is operated in a large commercial complex and provides the provision information to users who visits the large commercial complex, though it is contemplated that the information processing system 10 is operated in any other environment. For example, the provision information refers to an advertisement related to a product sold at a store or a coupon used at the store.

Figure 2:
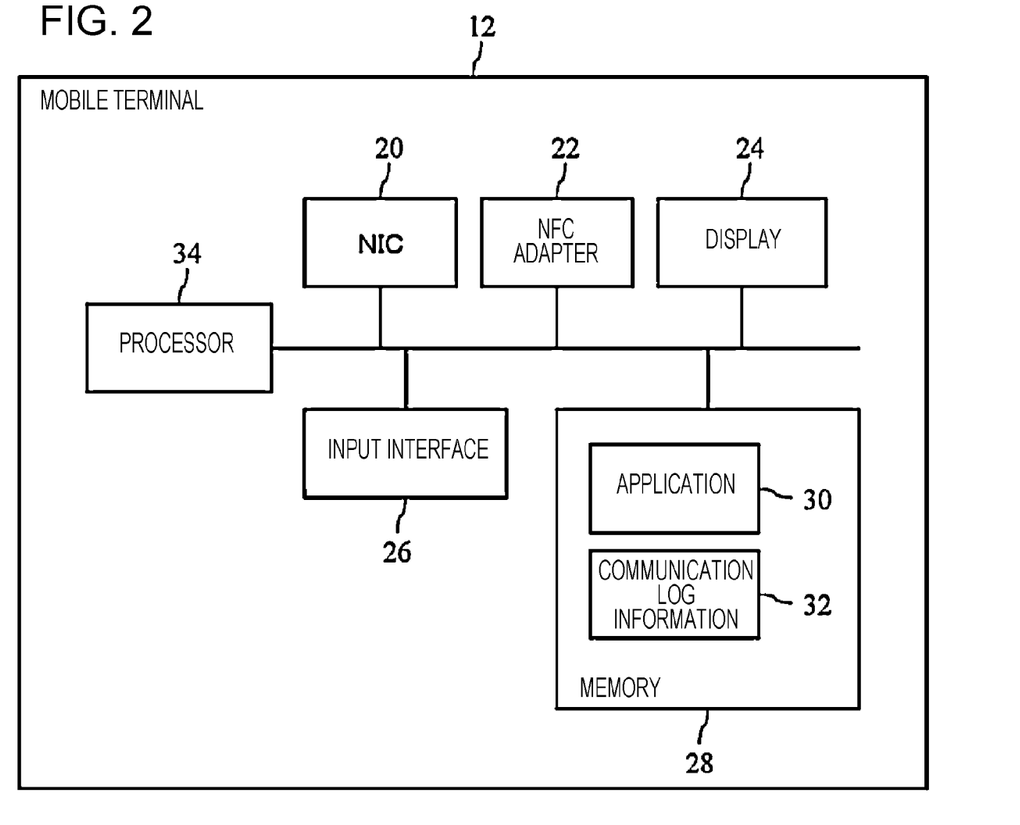
FIG. 2 illustrates a configuration of a mobile terminal.

FIG. 2 illustrates a configuration of the mobile terminal 12. The information processing system 10 includes multiple mobile terminals 12 identical to each other in configuration. The mobile terminal 12 is a computer held by and used by a user. For example, the mobile terminal 12 may be a smart phone or a tablet terminal.

A network interface card (NIC) 20 is a communication adapter that communicates with the information processing apparatus 14 via the communication network 16. According to the exemplary embodiment, the NIC 20 is a wireless NIC and is communicable with the information processing apparatus 14 via a wireless LAN and/or a cellular phone network.

A near field communication (NFC) adapter 22 performs short-range wireless communication with another apparatus (such as another mobile terminal 12) that is near the mobile terminal 12. The NFC may be any scheme of the short-range wireless communication as long as the NFC is communicable another apparatus near the mobile terminal 12. For example, the short-range wireless communication may be Bluetooth (registered trademark) or ZigBee (registered trademark).

The display 24 may include a liquid-crystal display. The display 24 displays a variety of screens including a screen displaying the provision information received from the information processing apparatus 14.

An input interface 26 includes a touch panel and buttons. The input interface 26 receives an instruction from a user.

A memory 28 includes embedded Multi Media Card (eMMC), a read-only memory (ROM) and/or random-access memory (RAM). The memory 28 stores a mobile terminal program used to operate elements in the mobile terminal 12. As illustrated in FIG. 2, the memory 28 stores an application 30 and communication log information 32.

The application 30 is delivered by an information providing entity that provides the provision information to the user. The application 30 is stored on the memory 28 when the user downloads and installs the application 30 on the mobile terminal 12. According to the exemplary embodiment, the information providing entity is a large commercial complex and the application 30 is delivered by the large commercial complex. Through the application 30, the user may acquire a variety of information about stores in the large commercial complex.

The application 30, when installed on the mobile terminal 12, assigns to a user a user identification (ID) as a user identifier identifying the user. When the use of the application 30 starts, attribute information related to the user is entered to the application 30. The attribute information includes, but is not limited to, a name, address, age, sex, liking (for example, liking for products, services, and food provided by the large commercial complex) of the user. The attribute information may include a user ID of another user related to the user and a relationship between the user and the related user. The related user may be another user who frequently accompanies the user, for example, the related user may be his or her family member, partner, or friend. The user ID and attribute information on the user are transmitted in an associated form to the information processing apparatus 14.

The application 30 has a function of the short-range wireless communication used to communicate with another mobile terminal 12 that is near the mobile terminal 12 and has the application 30 installed thereon. When the mobile terminal 12 having the application 30 installed thereon comes close the large commercial complex, the application 30 causes the NFC adapter 22 to start transmitting the user ID of the user. The application 30 also acquires the user ID that is transmitted from the other mobile terminal 12, having the application 30 installed thereon, and received by the NFC adapter 22. The application 30 stores on the communication log information 32 the user ID, received from the other mobile terminal 12 via the short-range wireless communication, and reception time in association with each other.

The short-range wireless communication is available to only a nearby mobile terminal 12 and is difficult for a distant mobile terminal 12 to use. Specifically, the successful reception of the user ID by the mobile terminal 12 from the other mobile terminal 12 via the short-range wireless communication signifies that the other mobile terminal 12 used by the user identified by the user ID is near the mobile terminal 12 having received the user ID.

In the discussion of the disclosure, a user (having transmitted a request for the provision information to the information processing apparatus 14 as described below) is referred to as a target user and a mobile terminal 12 used by the target user is referred to as a target mobile terminal 12*a*. A mobile terminal 12 near the target mobile terminal 12*a* is referred to as a nearby mobile terminal 12*b* and a user using the nearby mobile terminal 12*b* is referred to as a nearby user. The target user and target mobile terminal 12*a* are relative to the nearby user and nearby mobile terminal 12*b*. For example, if another user becomes a target user, the target user and target mobile terminal 12*a* may become the nearby user and nearby mobile terminal 12*b*, respectively. The target mobile terminal 12*a* and nearby mobile terminal 12*b*, if not differentiated from each other, are collectively and simply referred to as the mobile terminal 12. Similarly, the target user and nearby user, if not differentiated from each other, collectively and simply referred to as the user.

Figure 3:
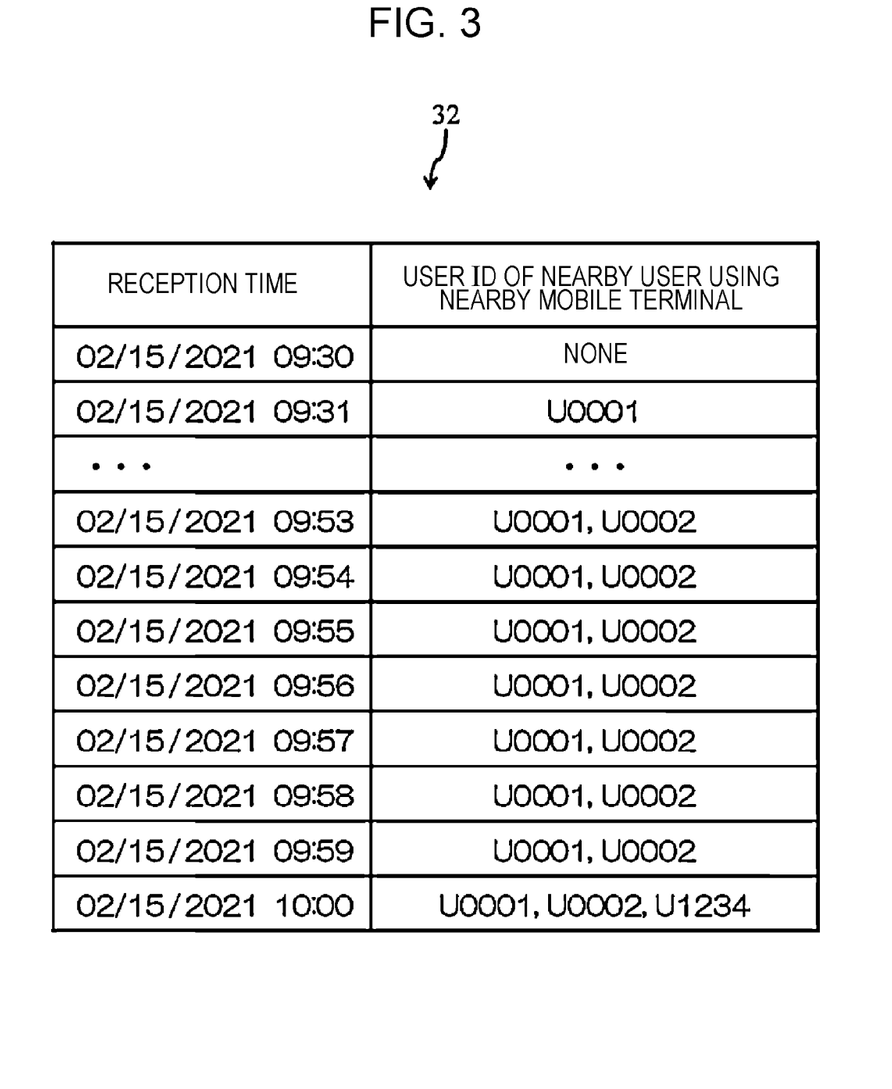
FIG. 3 is a first view of contents of communication log information.

FIG. 3 is a first view of contents of communication log information stored on the memory 28 in the mobile terminal 12. The communication log information 32 stored on the memory 28 in the target mobile terminal 12*a* indicates a log of the short-range wireless communication of the target mobile terminal 12*a* and, in particular, includes a user ID of the nearby user using the nearby mobile terminal 12*b* having performed the short-range wireless communication with the target mobile terminal 12*a*. Referring to FIG. 3, for example, on Feb. 15, 2021, 9:53 through 10:00, the target mobile terminal 12*a* continues to receive user ID "U0001" from a nearby mobile terminal 12*b* and user ID "0002" from another nearby mobile terminal 12*b*. This signifies that throughout time period of Feb. 15, 2021, 9:53 through 10:00, the target mobile terminal 12*a* is near the nearby user and nearby mobile terminal 12*b* indicated by the user ID U0001 and the nearby user and nearby mobile terminal 12*b* indicated by the user ID U002. In other words, this signifies that the nearby user identified by the user ID U0001 and the nearby user identified by the user ID U0002 have been near the target user.

According to the exemplary embodiment, the application 30 causes to be stored the user ID received from the other mobile terminal 12 via the short-range wireless communication every predetermined period of time (every minute in FIG. 3), though another method of acquiring the log of the nearby mobile terminal 12*b* via the short-range wireless communication may be contemplated. For example, the user ID and reception time may be recorded each time the user ID of the nearby user is received from the nearby mobile terminal 12*b* via the short-range wireless communication.

According to one of related-art techniques using the short-range wireless communication, a distance between a transmitter and receiver is estimated in accordance with a signal strength of a signal received by the receiver (received signal strength indication: RSSI)). Based on the signal strength of the user ID from the nearby mobile terminal 12*b*, the application 30 of the target mobile terminal 12*a* estimates a distance between the target mobile terminal 12*a* and the nearby mobile 12*b*. If the estimated distance is equal to or below a threshold distance, the communication log information 32 stores the user ID and reception time.

In the exemplary embodiment, the processor 34 refers to hardware in a broad sense. The processor 34 includes a general processor (e.g., CPU: Central Processing Unit) and at least one of dedicated processors (e.g., GPU: Graphics Processing Unit, ASIC: Application Specific Integrated Circuit, FPGA: Field Programmable Gate Array, and programmable logic device). The processor 34 is broad enough to encompass one processor or plural processors in collaboration which are located physically apart from each other but may work cooperatively. The processor 34 controls the elements in the mobile terminal 12 in accordance with the mobile terminal program stored on the memory 28.

The processor 34 transmits to the information processing apparatus 14 the request for the provision information, user ID of the target user, and communication log information 32 stored on the memory 28. According to the exemplary embodiment, when the processor 34 detects the proximity of the target mobile terminal 12a to the large commercial complex (namely, when the target user goes near the large commercial complex), the processor 34 transmits to the information processing apparatus 14 via the NIC 20 the request for the provision information, user ID of the target user, and communication log information 32. The proximity of the target mobile terminal 12a to the large commercial complex may be detected when the NFC adapter 22 receives a signal emitted from a beacon typically installed at the entrance of the large commercial complex. In response to an instruction of the target user, the processor 34 may transmit to the information processing apparatus 14 the request for the provision information, user ID of the target user, and communication log information 32.

Figure 4:
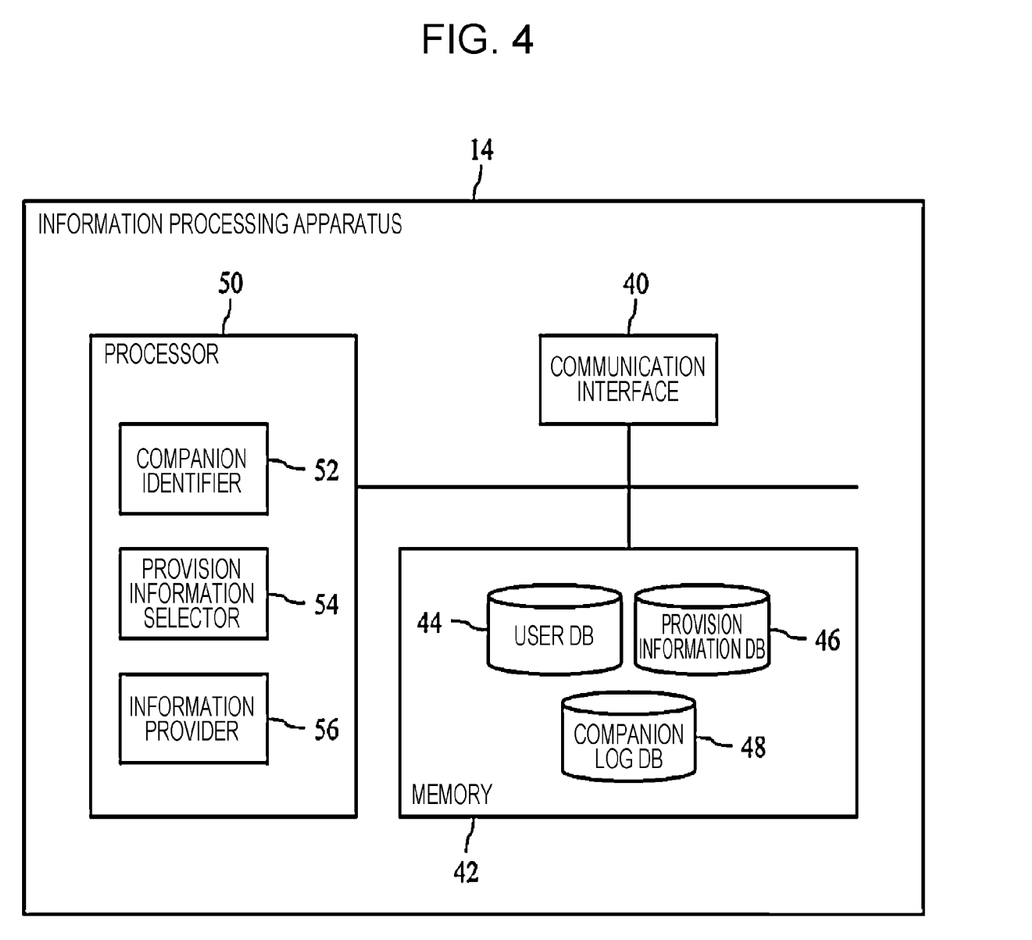
FIG. 4 illustrates a configuration of an information processing apparatus.

FIG. 4 illustrates a configuration of the information processing apparatus 14. The information processing apparatus 14 of the exemplary embodiment is a server computer. The information processing apparatus 14 may be any type of apparatus as long as the apparatus has the functions described below.

A communication interface 40 is a communication adapter that communicates with the NIC 20 in the mobile terminal 12 via the communication network 16.

A memory 42 includes hard disk drive (HDD), solid-state drive (SSD), eMMC, ROM and/or RAM. The memory 42 stores an information processing program that cause elements in the information processing apparatus 14 to operate. Referring to FIG. 4, the memory 42 stores a user database (DB) 44, provision information DB 46, and companion log DB 48.

Figure 5:
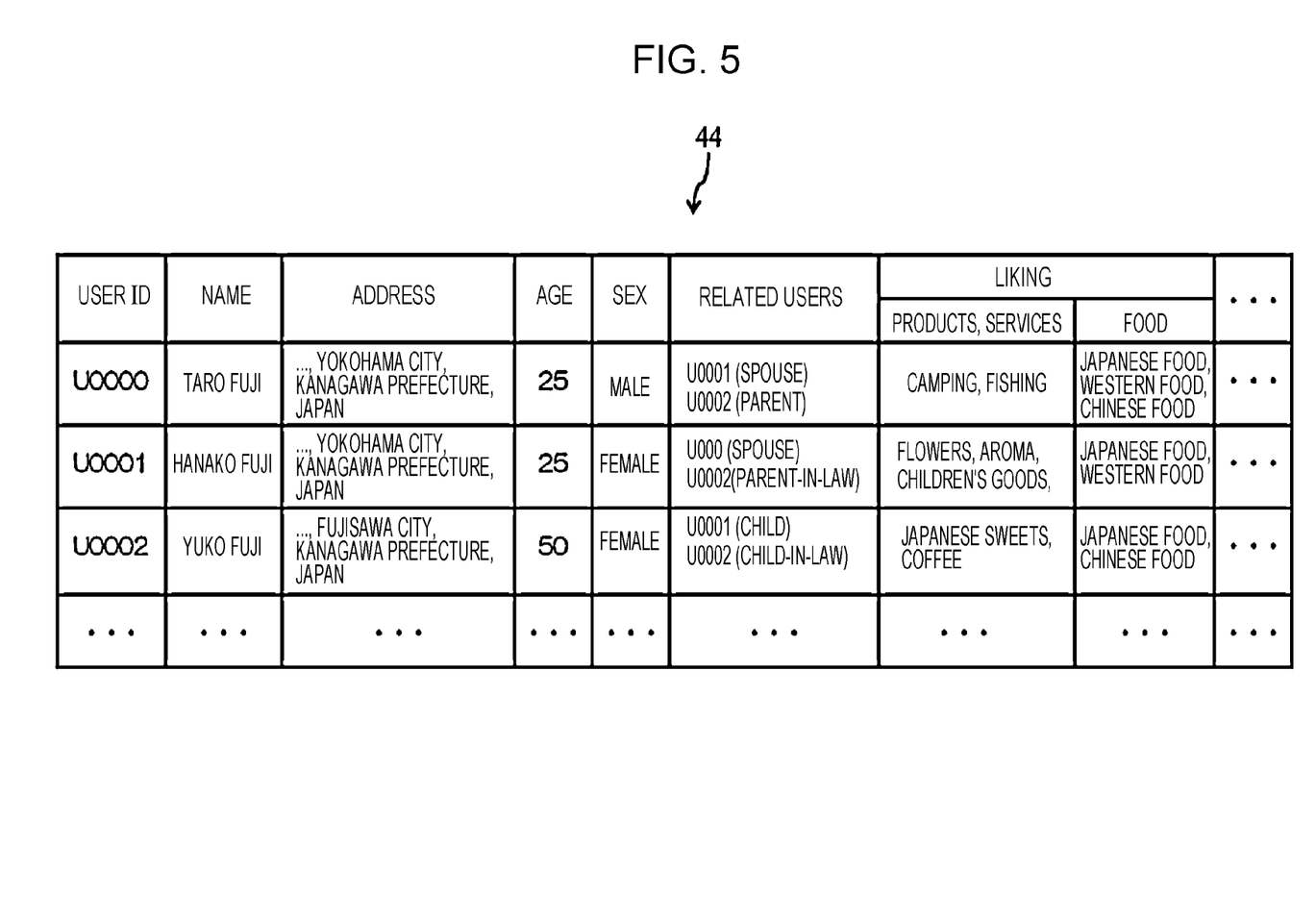
FIG. 5 illustrates an example of contents of a user database (DB)

FIG. 5 illustrates an example of contents of the user DB 44. The user DB 44 stores, in an associated form, the user ID of a user using each mobile terminal 12 and the attribute information on the user, received from each mobile terminal 12. As described above, the user ID is assigned by the application 30 and the attribute information on the user is entered to the mobile terminal 12 by the user when the user starts using the application 30.

The provision information DB 46 stores the provision information that the information processing apparatus 14 provides to the user and attribute information of the provision information. The provision information stored on the provision information DB 46 is created by an administrator of the information processing system 10. According to the exemplary embodiment, the provision information is an advertisement of a product or service provided in the large commercial complex. The advertisement may be image data displayed on a display or voice data. The advertisement may be a combination of the image data and voice data. The provision information is not limited to the advertisement and may be a coupon usable at a store in the large commercial complex.

Figure 6:
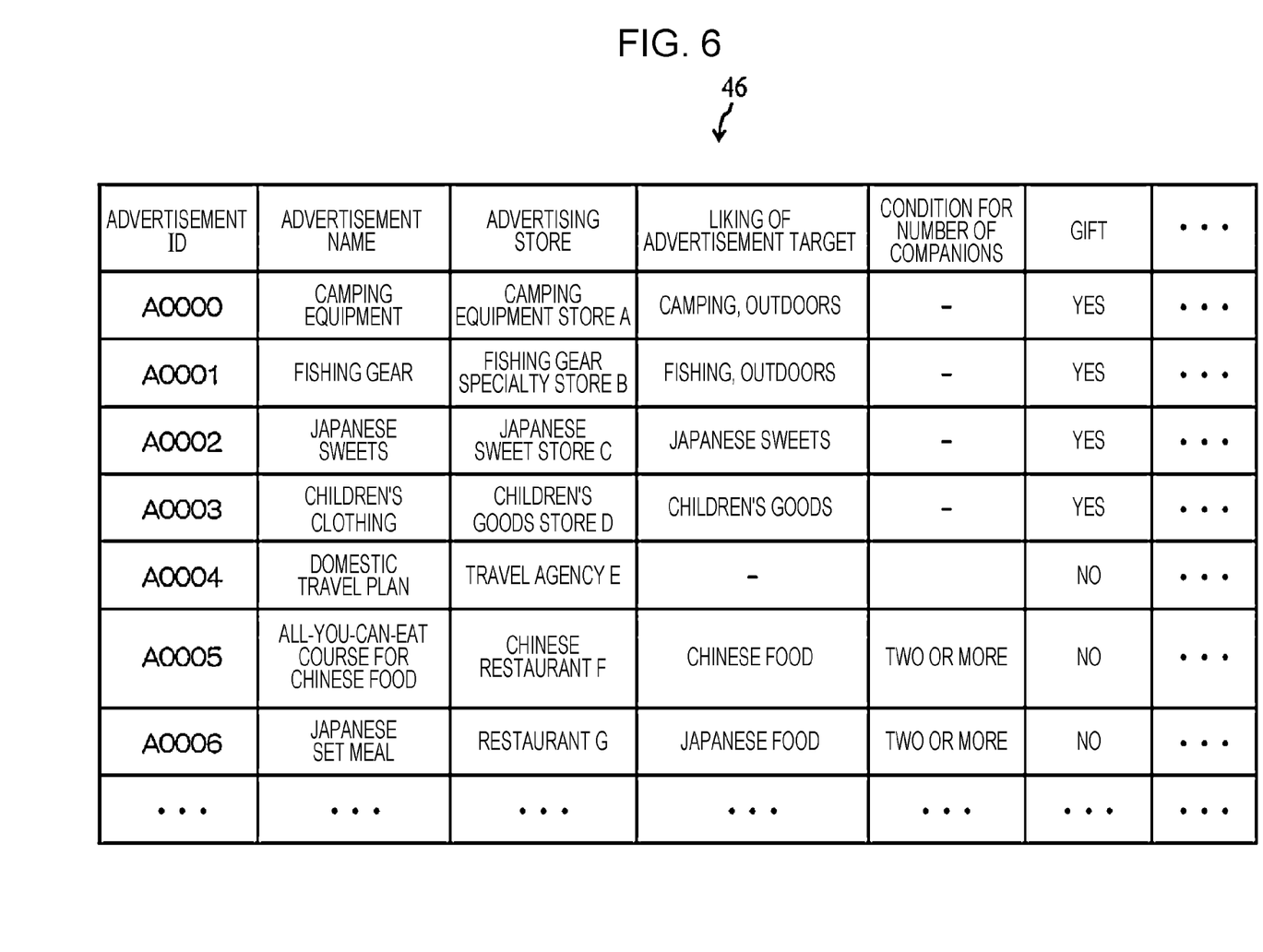
FIG. 6 illustrates an example of contents of a provision information DB.

FIG. 6 illustrates an example of contents of the provision information DB 46 and, in particular, illustrates an example of the attribute information of the provision information. Referring to FIG. 6, the provision information DB 46 stores the attribute information of the provision information (advertisement in the exemplary embodiment) in an associated form. The attribute information of the provision information may include an advertisement ID uniquely identifying an advertisement, name of the advertisement, advertising store providing an advertised product or advertised service, liking of advertisement target indicating the liking of a user appropriate for the advertisement, condition for the number of companions of the user appropriate for the advertisement, and information indicating whether the advertised product or service is a present. The information processing apparatus 14 assigns the advertisement ID. The administrator of the information processing system 10 may set the advertised name, advertising store, liking of the advertisement target, condition of the number of companions, and information indicating whether the advertised product or service is a present.

The companion log DB 48 is described together with a process of the companion identifier 52 below.

A processor 50 is a processor in a broad sense and includes a general-purpose processor (such as a CPU) and/or a dedicated processor (such as GPU, ASIC, FPGA or programmable logic device). The processor 50 may not be a single processor but plural processors in collaboration which are located physically apart from each other but may work cooperatively. Referring to FIG. 4, in accordance with the information processing program stored on the memory 42, the processor 50 performs functions as a companion identifier 52, provision information selector 54, and information provider 56.

The companion identifier 52 receives from the target mobile terminal 12a the request for the provision information, user ID of the target user, and communication log information 32 and identifies a companion accompanying the target user in accordance with the communication log information 32 and user ID of the target user. The companion is a person acting in concert with the target user. A variety of methods may be utilized to identify the companion of the target user in accordance with the communication log information 32. Referring to FIG. 3, the communication log information 32 lists combinations of user IDs of nearby users and reception times of the user IDs. The companion identifier 52 identifies as a companion a nearby user that is determined as being near the target user at the latest time (considered the present time) in the communication log information 32.

According to the exemplary embodiment, in accordance with the communication log information 32, the companion identifier 52 identifies as a companion a nearby user that is determined to have been near the target user for a predetermined period of time until the present time. In this way, the companion is determined after excluding a nearby user who is not a companion of the target user and simply happens to be near the target user at the present time. The predetermine period of time may be appropriately set by the administrator of the information processing system 10. For example, the predetermined period of time may now be 5 minutes and the communication log information 32 may be the contents as illustrated in FIG. 3. In such a case, the companion identifier 52 identifies as the companions the nearby user identified by user ID U0001 (hereinafter simply referred to as user U0001) and user U0002 who remains near the target user for 5 minutes from 9:55 to 10:00 (present time) until the present time on Feb. 15, 2021. Since a nearby user U1234 being near the target user at the present time is not near the target user from 9:55 to 9:59 on Feb. 15, 2021, the companion identifier 52 does not identify the nearby user U123 as a companion of the target user.

The companion identifier 52 references the user DB 44 and identifies, as a companion of the target user, a nearby user who is related to the target user on the user DB 44, from nearby users who are determined to have been near the target user for the predetermined period of time until the present time. For example, persons may have to line up in a row to enter a popular large commercial complex. In the row, a user ahead of or behind the target user is not a companion and happens to have been near the target user for the predetermined period of time until the present time. In such a case, the companion identifier 52 identifies only the related user of the target user as a companion. The companion identifier 52 thus identifies the companion after excluding a user who is not a companion and happens to have been near the target user for the predetermined period of time until the present time.

When the companion of the target user is identified, the companion identifier 52 causes the companion log DB 48 to store the user ID of the target user and the user ID of the identified companion in association with each other. In each combination of the user ID of the target user and the user ID of the companion, the companion identifier 52 counts the number of times by which the companion is identified as the companion of the target user. The counted number and the combination of the user ID of the target user and the user ID of the companion are stored in association with each other on the companion log DB 48.

When the companion of the target user is identified, the companion identifier 52 determines whether the combination of the user ID of the target user and the user ID of the companion has been stored on the companion log DB 48. If the combination has not yet stored on the companion log DB 48, the companion log DB 48 is caused to newly store the combination with "one time" as the number of accompanying linked to the combination. If the combination has been stored on the companion log DB 48, the number of accompanying of the combination is incremented by one.

Figure 7:
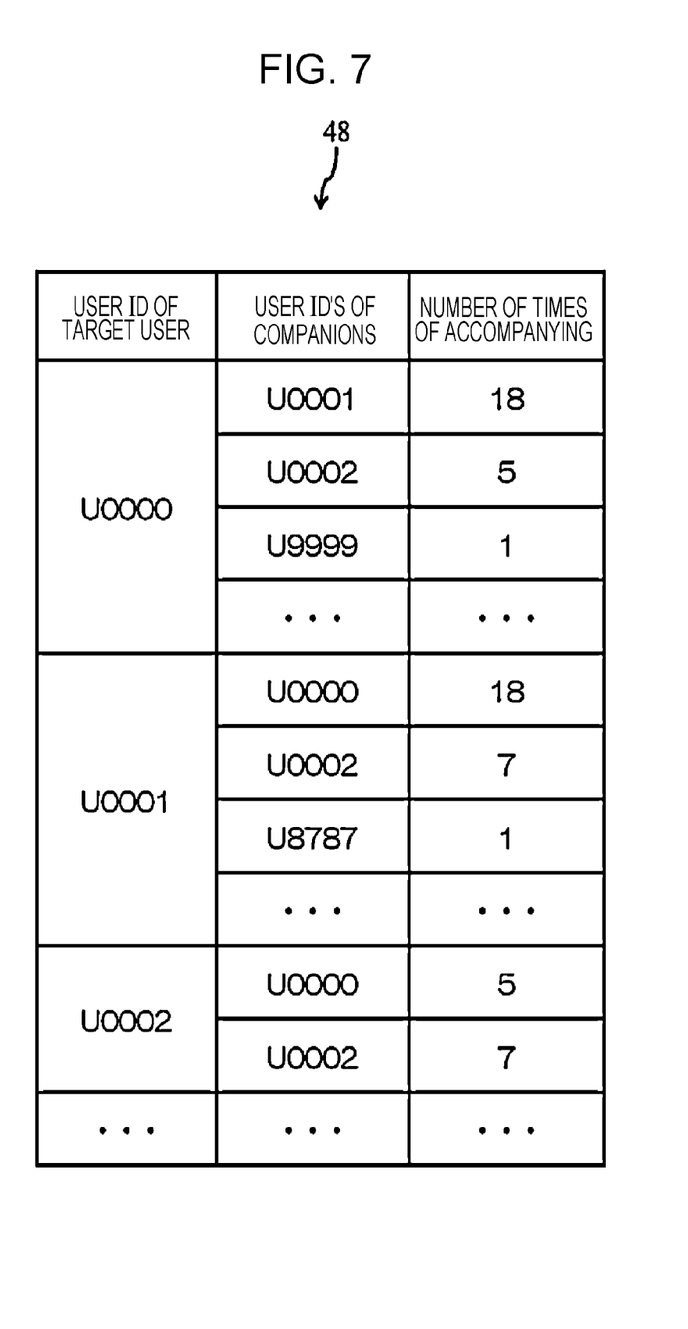
FIG. 7 illustrates an example of contents of a companion log DB.

FIG. 7 illustrates an example of contents of the companion log DB 48. The number of times by which a companion is identified as a companion of the target user is learned on each of combinations of the target user and companions by referencing the companion log DB 48.

By referencing the companion log DB 48, the companion identifier 52 may identify as the companion a nearby user that is selected, based on the number of times of being identified as the companion of the target user in the past, from among the nearby users that are determined to have been near the target user for the predetermined period of time until the present time. For example, the administrator of the information processing system 10 sets up a threshold number of times. The companion identifier 52 may identify as the companion a nearby user who has the number of times of being identified as the companion of the target user in the past and being equal to or above the threshold number, from among the nearby users that are determined to have been near the target user for the predetermined period of time until the present time. It is less likely that a user unrelated to the target user is identified as a companion of the target user by a considerable number of times in the past. On the other hand, it is more likely that a nearby user identified as a companion of the target user by a considerable number of times in the past is an authentic companion of the target user. By identifying the companion in accordance with the number of times of being identified as the companion of the target user in the past, the companion is thus identified after excluding a nearby user who is not a companion of the target user and simply happens to have been near the target user for the predetermined period of time until the present time.

The provision information selector 54 selects provision information from the provision information stored on the provision information DB 46, in accordance with the target user and the companion identified by the companion identifier 52. According to the exemplary embodiment, the provision information selector 54 selects an advertisement from the provision information DB 46.

The provision information selector 54 may select an advertisement in view of a total number of people of the target user and companions. Specifically, the provision information selector 54 selects an advertisement where the total number of people of the target user and companions satisfies the condition for the number of companions indicated on the provision information DB 46. For example, if the total number of people of the target user and companions is three, the provision information selector 54 selects an advertisement having the condition for the number of companions being "two or more." On the other hand, the provision information selector 54 does not select an advertisement having the condition for the number of companions being "four or more."

The provision information selector 54 may select the provision information in accordance with the attribute information on the target user and/or companions by referencing the user DB 44. For example, referring to the user DB 44 in FIG. 5, the target user is U0000 and companions are user U0001 and user U0002. In this case, since the liking for the food of the three persons includes "Japanese food," the provision information selector 54 selects an advertisement of a Japanese restaurant. Selection method of selecting advertisement in accordance with the attribute information on the target user and companions is not limited to that method. The provision information selector 54 may select an advertisement appropriate for the target user and companions in accordance with an address, age, sex, and liking of the target user and companions.

The information provider 56 provides to the target user and/or companions the provision information selected by the provision information selector 54. A variety of methods may be contemplated to provide the provision information. For example, the information provider 56 may transmit an advertisement as the provision information, selected by the provision information selector 54, to the target mobile terminal 12a and the nearby mobile 12b used by the companion and may cause the display 24 in the mobile terminal 12 to display the advertisement. Information on information destination about the mobile terminal 12 used by each user may be stored on the user DB 44.

If multiple digital signages are arranged in a large commercial complex, the information provider 56 may transmit the advertisement to a digital signage which the target user and companions go near and may cause that digital signage to display the advertisement. When the target user and companions are near the digital signage, a beacon receiver arranged close to each digital signage receives a user ID transmitted from the target mobile terminal 12a or the nearby mobile terminal 12b. The proximity of the target user and companions to the digital signage is thus detected.

As described above, in the information processing system 10 of the exemplary embodiment, the companion identifier 52 identifies the companion of the target user in accordance with the communication log information 32 transmitted from the target mobile terminal 12a. The provision information selector 54 identifies the provision information responsive to the target user and companions and the information provider 56 provides the provision information to the target user and companions. This signifies that the target user is free from entering information indicating the companion of the target user to the information processing apparatus 14 and receives the provision information responsive to the target user and companions.

It is contemplated that a companion having entered the large commercial complex together with the target user moves differently from and not in concert with the target user during the staying in the large commercial complex. Specifically, with the passage of time, the movement of the companion of the target user may dynamically change. In response to the movement of the companion of the target user with the passage of time, the processor 50 may dynamically update the provision information to be provided to the target user and/or companions. An operation of updating the provision information is described below in greater detail.

The target mobile terminal 12a performs repeatedly the short-range wireless communication with the nearby mobile terminal 12b having the application 30 installed thereon and continues to update the communication log information 32 during staying until the target mobile terminal 12a goes outside the large commercial complex. During the staying in the large commercial complex, the target mobile terminal 12a transmits in an intermittent manner the request for the provision information, user ID of the target user, and updated communication log information 32 to the information processing apparatus 14. According to the exemplary embodiment, the target mobile terminal 12a transmits every 5 minutes to the information processing apparatus 14 the request for the provision information, user ID of the target user, and updated communication log information 32.

Each time when the companion identifier 52 receives the request for the provision information, user ID of the target user, and updated communication log information 32 from the target mobile terminal 12a, the companion identifier 52 identifies the companion of the target user through the operations described above. The companion identifier 52 compares the companion of the target user with the advertisement provided last time to the target user or companion (the companion identifier 52 simply stores the companion identified at the advertisement last time) with the companion of the target user identified this time. The companion identifier 52 thus determines whether there is a change of the companion of the target user.

If the companion of the target user has been changed to another companion, the provision information selector 54 selects the advertisement responsive to the target user and the other companion and the information provider 56 provides the advertisement to the target user and the other companion. On the other hand, if there is no change of the companion of the target user, the provision information selector 54 does not perform the selection operation of the advertisement and the information provider 56 does not newly provide the advertisement.

Figure 8:
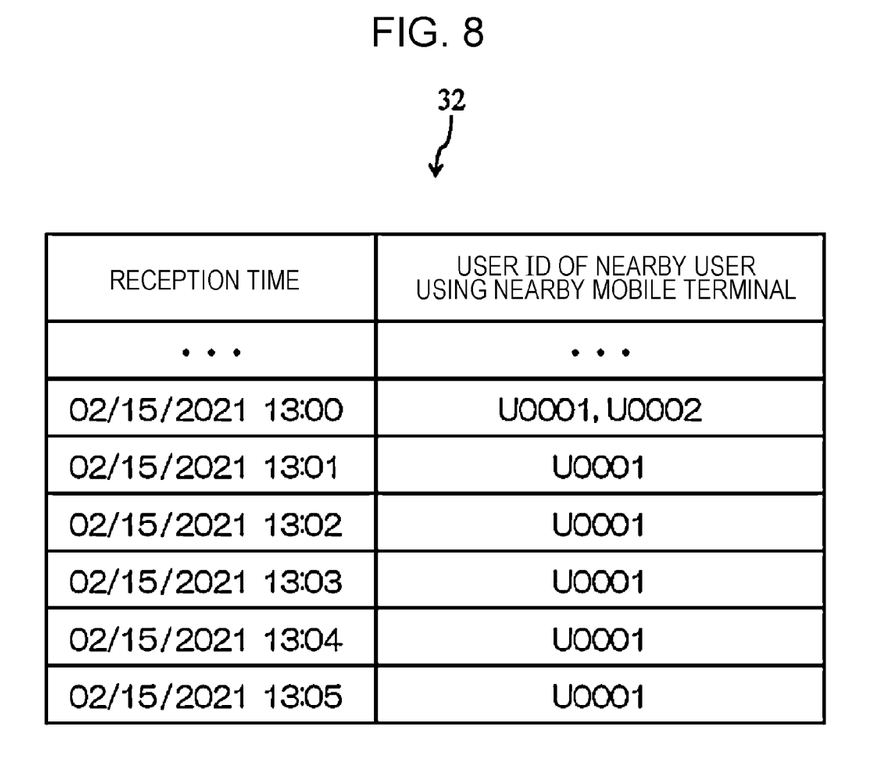
FIG. 8 is a second view of contents of the communication log information.

User U0001 and user U0002 may now be identified as the companions of the target user U0000 by the companion identifier 52 and updated communication log information 32 stored on the target mobile terminal 12a of the target user may be contents illustrated in FIG. 8 after the advertisement is provided to the target user or companions. In such a case, the companion identifier 52 identifies user U0001 as a present companion of the target user. By comparing the user U0001 and user U0002 of the target user with the advertisement provided last time with the user U0001 of the target user this time, the companion identifier 52 determines that there is a change of companions of the target user. Specifically, the companion identifier 52 may determine that the target user has parted from the user U0002 on the way.

The provision information selector 54 newly selects an advertisement responsive to the target user U0000 and the user U0001 as a present companion and the information provider 56 provides the newly selected advertisement to the target user U0000 or user U0001.

The user U0002, though determined as the companion of the target user in the past, is not presently determined as a companion of the target user. In other words, the user U0002 has parted from the target user. The provision information selector 54 may reference the user DB 44 and select the provision information in accordance with the attribute information on the user who has parted from the target user on the way.

In the operation example described above, the provision information selector 54 may select, as an advertisement that is to be provided to the target user U0000 or the user U0001 as the present companion, the advertisement related to a present for the user U0002 determined as a companion in the past. In such a case, the provision information selector 54 identifies the liking of the user U0002 by referencing the attribute information on the U0002 on the user DB 44 and selects an advertisement for a product or service matching the liking of the user U0002 as a present from among the advertisements stored on the provision information DB 46.

The information processing system 10 of the exemplary embodiment has been described above. The flow of the process of the information processing apparatus 14 is described below with reference to a flowchart in FIG. 9.

Figure 9:
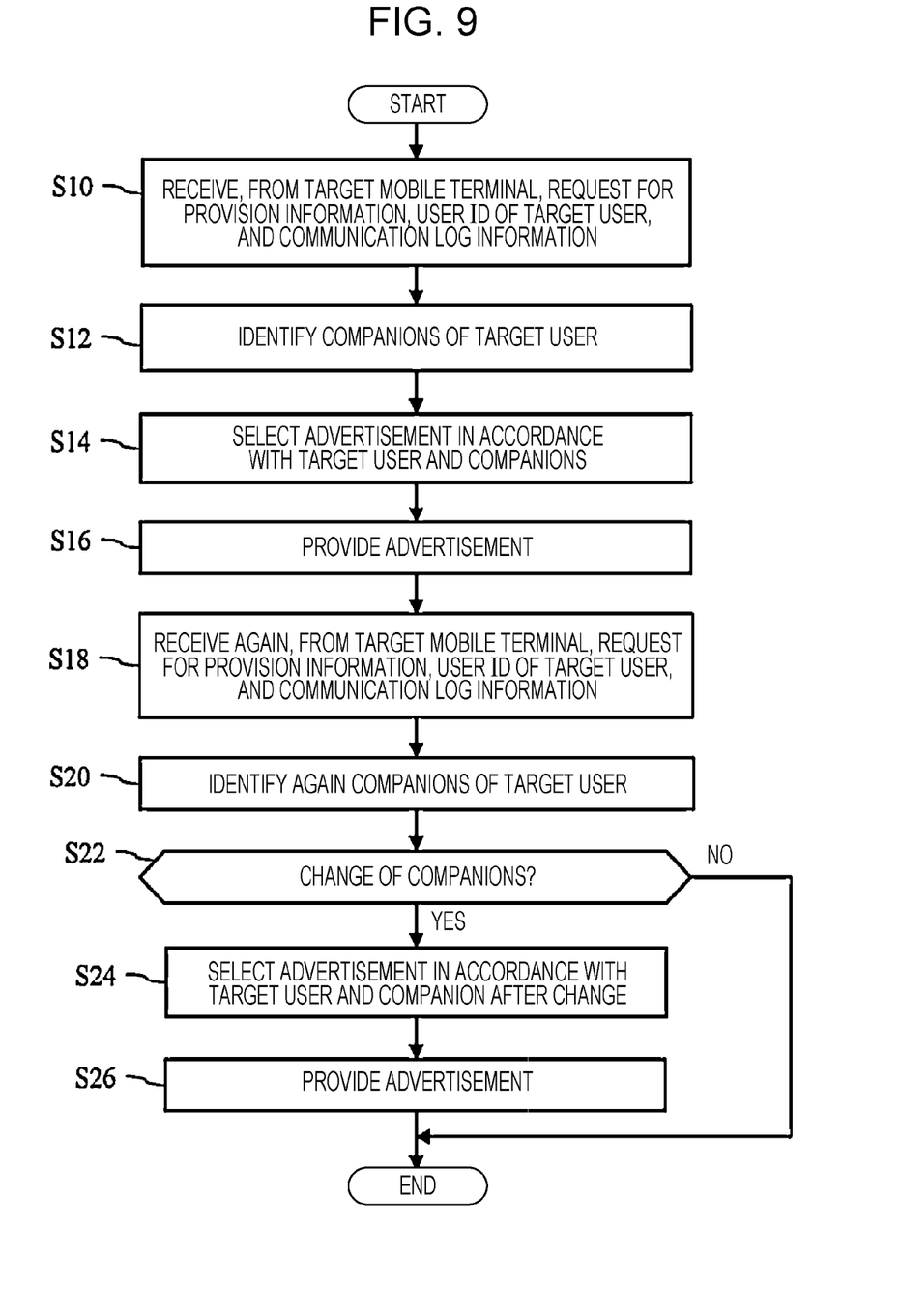
FIG. 9 is a flowchart illustrating a flow of a process of the information processing apparatus.

In step S10, the information processing apparatus 14 receives, from the target mobile terminal 12a, the request for the provision information, user ID of the target user, and communication log information 32.

In step S12, the companion identifier 52 identifies a companion of the target user in accordance with the communication log information 32 received in step S10.

In step S14, in accordance with the target user and the companion identified in step S12, the provision information selector 54 selects an advertisement from among advertisements stored on the provision information DB 46.

In step S16, the information provider 56 provides the advertisement selected in step S14 to the target user or the companion identified in step S12.

In step S18, the information processing apparatus 14 receives again, from the target mobile terminal 12a, the request for the provision information, user ID of the target user, and communication log information 32.

In step S20, the companion identifier 52 identifies again the companion of the target user in accordance with the communication log information 32 received in step S18.

In step S22, the companion identifier 52 compares the companion identified with the advertisement provided last (the companion identified in step S12) with the companion identified this time (the companion identified in step S20) and determines whether there is a change of the companion of the target user. If there is a change, the process proceeds to step S24. If there is no change, the process ends.

In step S24, the provision information selector 54 selects an advertisement from the advertisements stored on the provision information DB 46 in accordance with the target user and the companion identified in step S20 (companion after the change).

In step S26, the information provider 56 provides the advertisement selected in step S24 to the target user or the companion identified in step S20.

Each time when the request for the provision information, user ID of the target user, and communication log information 32 are received from the target mobile terminal 12a, the processor 50 in the information processing apparatus 14 iterates operations in steps S20 through S26.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   receive, from a target mobile terminal via the communication interface, a request for provision information, a communication log information, and a first user identifier (ID) of a target user of the target mobile terminal;
   identify a companion accompanying the target user from the communication log information which indicates a log of short-range wireless communication of the target mobile terminal used by the target user and including a second user ID of a nearby user using a nearby mobile terminal having performed the short-range wireless communication with the target mobile terminal; and
   provide, to the target user and the companion, the provision information that is selected in accordance with the target user and the companion.

2. The information processing apparatus according to claim 1, wherein the processor is configured to identify the nearby user using the nearby mobile terminal which is determined to have been nearby the target terminal for at least a predetermined period of time until present time as the companion of the target user of the target mobile terminal.

3. The information processing apparatus according to claim 2, wherein the processor is configured to identify the nearby user using the nearby mobile terminal which is determined to have been nearby the target terminal for at least the predetermined period of time until the present time as the companion of the target user of the target mobile terminal comprising:
   identify the companion from among nearby users based on whether the nearby mobile terminal which is nearby the target mobile terminal for at least the predetermined period of time until the present time, and
   in response to the nearby mobile terminal being nearby the target mobile terminal for at least the predetermined period of time until the present time, the nearby user is determined as the companion and identified by referring to a user database which has stored information of multiple users having been associated with the target users.

4. The information processing apparatus according to claim 3, wherein the processor is configured to reference the user database having stored attribute information on each of the multiple users and select the provision information in accordance with the attribute information on the target user and the companion.

5. The information processing apparatus according to claim 4, wherein the processor is configured to, in response to a change of the companion along with a passage of time, dynamically modify the provision information to be provided to the target user and the companion.

6. The information processing apparatus according to claim 5, wherein the processor is configured to select the provision information in accordance with attribute information on another nearby user that, though determined to be a companion of the target user in a past, is not presently determined as the companion of the target user.

7. The information processing apparatus according to claim 2, wherein the processor is configured to
   identify the companion based on a number of times the nearby mobile terminal identified as being near the target user by referring to the log of short-range wireless communication, and
   the nearby mobile terminal is determined as the companion when the number of times the nearby mobile terminal being nearby the target mobile terminal for the predetermined period of time until the present time exceeds a threshold number.

8. A non-transitory computer readable medium storing a program causing a computer to execute a process, the process comprising:
   receiving, from a target mobile terminal via the communication interface, a request for provision information, a communication log information, and a first user identifier (ID) of a target user of the target mobile terminal;
   identifying a companion accompanying the target user from the communication log information which indicates a log of short-range wireless communication of the target mobile terminal used by the target user and including a second user ID of a nearby user using a nearby mobile terminal having performed the short-range wireless communication with the target mobile terminal; and
   providing, to the target user and the companion, the provision information that is selected in accordance with the target user and the companion.

9. An information processing method comprising:
   receiving, from a target mobile terminal via the communication interface, a request for provision information, a communication log information, and a first user identifier (ID) of a target user of the target mobile terminal;

identifying a companion accompanying the target user from the communication log information which indicates a log of short-range wireless communication of the target mobile terminal used by the target user and including a second user ID of a nearby user using a nearby mobile terminal having performed the short-range wireless communication with the target mobile terminal; and providing, to the target user and the companion, the provision information that is selected in accordance with the target user and the companion.

* * * * *